Figure 2:
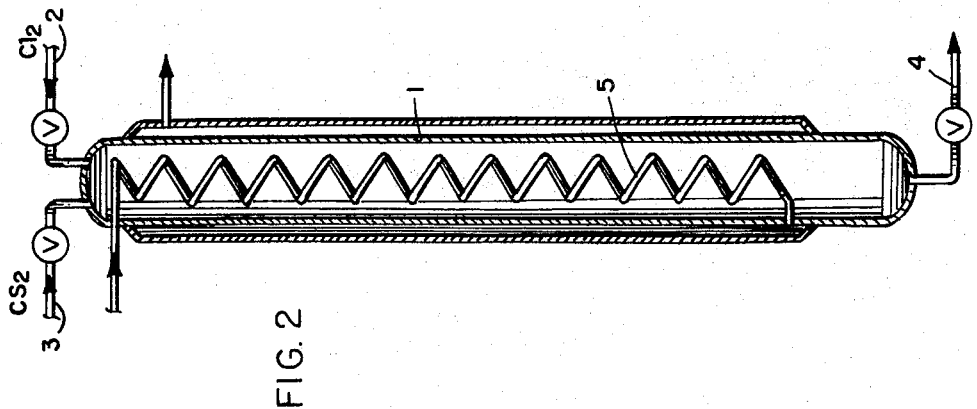

United States Patent

Meyer et al.

[15] 3,673,246

[45] June 27, 1972

[54] PROCESS FOR THE PRODUCTION OF TRICHLOROMETHANE-SULFENYL CHLORIDE

[72] Inventors: Gerhard Meyer, Obernburg; Helmut Magerlein; Hans-Dieter Rupp, both of Erlenbach, all of Germany

[73] Assignee: Glanzstoff AG, Wuppertal, Germany

[22] Filed: Jan. 2, 1970

[21] Appl. No.: 5

[52] U.S. Cl. .........................................................260/543 H
[51] Int. Cl. .......................................................C07c 145/00

[58] Field of Search ..............................................260/543 H

Primary Examiner—Lorraine A. Weinberger
Assistant Examiner—Robert Gerstl
Attorney—Johnston, Root, O'Keeffe, Keil, Thompson & Shurtleff

[57] ABSTRACT

Process for producing trichloromethane-sulfenyl chloride ($CCl_3SCl$) wherein carbon disulfide is reacted with chlorine on activated carbon at temperatures of about $-5°$ C. to $+100°$ C.

10 Claims, 2 Drawing Figures

PATENTED JUN 27 1972 3,673,246

INVENTORS:
GERHARD MEYER
HELMUT MÄGERLEIN
HANS-DIETER RUPP
BY
Johnston, Root, O'Keeffe, Keil, Thompson & Shurtleff
ATT'YS

PROCESS FOR THE PRODUCTION OF TRICHLOROMETHANE-SULFENYL CHLORIDE

This invention is concerned with a process for the production of trichloromethane-sulfenyl chloride, sometimes referred to as perchloromethylmercaptan.

Trichloromethan-sulfenyl chloride has previously been prepared by the catalytic chlorination of carbon disulfide in a manner first described by Rathke [Ann., Vol. 167, page 195 (1873)] Iodine has been used almost exclusively as the catalyst for this reaction in an additive amount of 0.1 to 1.1 percent by weight. Below about 30° C., the reaction proceeds according to the following equations:

$$CS_2 + 3Cl_2 \xrightarrow{I_2(cat.)} CCl_3SCl + SCl_2 \quad (1)$$
$$2CS_2 + 5Cl_2 \xrightarrow{I_2(cat.)} 2CCl_3SCl + S_2Cl_2 \quad (2)$$

In addition to sulfur dichloride and disulfur dichloride, the reaction also yields carbon tetrachloride, thiophosgene and other compounds as undesirable by-products. The readily volatile byproducts such as carbon tetrachloride and sulfur dichloride could be separated from the reaction mixture by distillation, but it is extremely difficult to separate trichloromethane-sulfenyl chloride and disulfur dichloride in this manner. During the distillation at normal or atmospheric pressure, the trichloromethane-sulfenyl chloride decomposes because of its thermal instability. At highly reduced pressures, the boiling points of trichloromethane-sulfenyl chloride and disulfur dichloride differ only slightly. Processes were therefore recommended for isolation of the trichloromethane-sulfenyl chloride from the chlorinated mixture which depended upon a chemical conversion of the sulfur chlorides into easily separable compounds.

For example, the sulfur chlorides can be hydrolyzed and broken down in an aqueous medium, especially by means of a steam distillation (see, e.g.: Organic Synthesis, Coll. Vol. 1, page 502 (1962); and Authenrieth and Hefner, Ber., Vol. 58, page 2151 (1952)). In this case, very large amounts of a waste gas (HCl, So₂) occur which are extremely difficult to handle. The hydrolytic decomposition can also be carried out in the presence of an oxidizing agent, e.g., in the presence of an excess of chlorine (see German Pat. No. 915,335). In this process, sulfuric acid and hydrochloric acid are formed from the sulfur chlorides. However, such a separation procedure is costly on account of the additional large amounts of chlorine which must be added.

Other procedures, according to which the sulfur chlorides have been converted into polythionates, thiosulfates, chlorides, etc., by reaction of the chlorinated mixture with sulfur dioxide, neutral or acid sulfites, have been found to be time-consuming and expensive (see German Pat. No. 910,297). Other separation processes have become known wherein the sulfur chlorides have been converted into sulfur, thionyl chloride and sulfur dioxide under the action of sulfur trioxide (U.S. Pat. No. 2,664,442) or into hydrochloric acid, sulfur dioxide and sulfur under the action of aliphatic ethers or alcohols (U.S. Pat. No. 2,545,285).

From this prior art, it will be recognized that it is quite difficult and expensive to work up the chlorinated mixture produced according to known processes in order to recover the desired product. The proportion of byproducts is quite high while the yield and purity of the trichloromethane-sulfenyl chloride is correspondingly low. Moreover, the above-noted prior chlorination processes can only be effectively carried out in a discontinuous manner.

Attempts have been made to carry out a continuous production of trichloromethane-sulfenyl chloride. According to the process described D.D.R. Pat. No. 36,260 (East Germany), the chlorination is carried out in the presence of iodine as catalyst, using columns loaded with a packing material. In a chlorinating zone of the column in which the temperature is maintained at 15°–25° C., there are reacted 2.25 to 3 mols of chlorine per mol of carbon disulfide, the residual chlorine remaining dissolved in the carbon disulfide. This mixture is conducted into a second column wherein the chlorine freed from the solution is reacted with carbon disulfide in an after-reaction zone maintained 15°–25° C. In this process and especially in the after-reaction zone, long retention times are necessary. The chlorinated mixture consists of about 42 percent of byproducts of low volatility and about 58 percent of a liquid residue containing the trichloromethane-sulfenyl chloride. From this residue, trichloromethane-sulfenyl chloride is isolated by means of steam distillation in a yield of only about 60 to 70 percent of the theoretical yield.

Furthermore, a process is disclosed in the German Patent specification No. 1,229,518, which can also be carried out continuously. According to this process, the chlorination is accomplished in reaction towers in the presence of a 5 to 35 percent aqueous hydrochloric acid, preferably in a chlorinated solvent medium, e.g., in trichloromethane-sulfenyl chloride itself as the solvent, and at temperatures of 0°–46° C. The reaction proceeds according to the following equation:

$$CS_2 + 5Cl_2 + 4H_2O \xrightarrow{(HCl)} CCl_3SCl + H_2SO_4 + 6HCl \quad (3).$$

This process affords relatively good yields with relatively smaller amounts of by-products, but requires additional chlorine for conversion of the sulfur chlorides into $H_2SO_4$ and HCl.

One object of the present invention is to provide a relatively simple and selective chlorination process in which carbon disulfide can be reacted with chlorine to give extraordinarily high yields of trichloromethane-sulfenyl chloride. Another object of the invention is to provide such a chlorination process which can be carried out continuously and which permits a relatively simple separation and recovery of the desired product. Other objects and advantages of the invention will become more apparent upon consideration of the following detailed specification.

It has now been found, in accordance with the invention, that one can produce trichloromethane-sulfenyl chloride in high yields by reacting carbon disulfide with chlorine on or in intimate contact with activated carbon. The reaction can be carried out within a relatively broad temperature range of about −5° to +100° C., preferably about −5° to +40° C., and it is especially desirable to operate continuously by conducting the reactants through a suitable reaction tube or zone containing a granulated active carbon, especially a fixed bed of activated carbon particles. By suitable selection of the temperature conditions and the molar ratio of carbon disulfide to chlorine, the chlorination proceeds either almost exclusively according to Equation (1) above or almost exclusively according to Equation (2) above.

Figure 1:
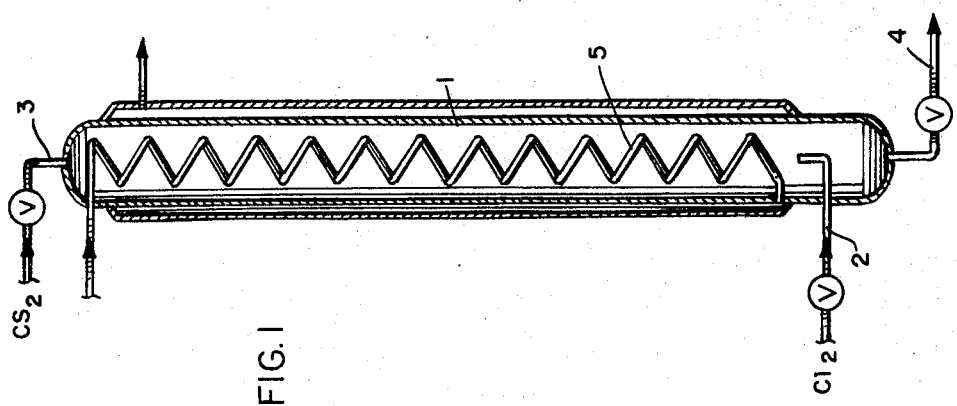

The process according to the invention can be carried out in various ways, either discontinuously or continuously. A continuous process is of course most advantageous, and the invention is therefore further described in conjunction with the accompanying drawing in which:

FIG. 1 is a schematic side elevation of one apparatus for conducting a continuous process according to the invention; and FIG. 2 is a schematic side elevation of another apparatus providing a variation in the same continuous process.

The apparatus illustrated in FIG. 1 is especially preferred for purposes of the invention. The reaction tube 1 is filled with active carbon particles and is provided with an inlet line 2 at the lower end for the introduction of chlorine and another inlet line 3 at the upper end for the introduction of carbon disulfide. By means of suitable valves, the molar ratio of carbon disulfide to chlorine can be controlled at a predetermined value within limits of about 1:2 to 1:4 during continuous operation. In this particular apparatus, the reaction components are thus directed in countercurrent streams within the reaction tube. By means of suitable cooling devices, e.g., by using a double jacketed reaction tube and/or a cooling coil 5 installed uniformly throughout the layer or bed of active carbon, care is taken to maintain the reaction temperature at a selected temperature of from about −5° to +100° C., preferably −5° to +40° C. The resulting chlorinated mixture is continuously withdrawn through the line 4.

According to another embodiment, the process of the invention can also be carried out in the apparatus illustrated in FIG. 2. In this instance, the same reaction tube 1 filled with active carbon and equipped with a cooling jacket and/or cooling coil 5 is essentially the same as that shown in FIG. 1 except that both the chlorine inlet 2 and the carbon disulfide inlet 3 enter into the upper end of the reaction tube, and both reaction components are conducted concurrently through the tube 1. The chlorinated reaction mixture is again withdrawn through the outlet line 4 at the bottom of the tube. In this method, the reaction of chlorine and carbon disulfide takes place preponderantly in a relatively short zone at the upper end of the active carbon bed or packing, so that the greatest portion of the heat of reaction is set free in this short zone. A control or regulation of the temperature in this reaction zone is therefore more difficult than when using the apparatus of FIG. 1 where the heat of reaction is set free over a longer reaction zone in the active carbon bed.

Since the recovery of the desired product is technically more complicated when the chlorinated reaction mixture contains disulfur dichloride, as noted above, it is especially advantageous to control the chlorination reaction such that it proceeds according to equation (1), i.e., to produce selectively sulfur dichloride in preference to disulfur dichloride. It has been proved that the most favorable conditions are achieved when the molar ratio of $CS_2:Cl_2$ amounts to about 1:3 to 1:4 and the —temperature is selected between about 5° C. and +40° C. The carbon disulfide is then chlorinated almost exclusively according to Equation (1), so that in addition to trichloromethane-sulfenyl chloride, practically only sulfur dichloride is formed. The chlorinated mixture contains only very slight amounts of disulfur dichloride in a reaction corresponding to Equation (2).

The chlorinated mixture can be worked up in a conventional manner by distillation. One thus obtains a lower boiling fraction which essentially contains sulfur dichloride, small amounts of unreacted chlorine and carbon disulfide as well as some carbon tetrachloride. A higher boiling fraction is then obtained which contains the desired trichloromethane-sulfenyl chloride and very small amounts of disulfur dichloride. The proportion of this $S_2Cl_2$ by product in this higher boiling fraction is so low when the reaction has been-properly conducted that the trichloromethane-sulfenyl chloride normally does not require any further purification. However, it can be further purified in a conventional manner, e.g., by steam distillation.

It has been established that the content of disulfur dichloride in the crude trichloromethane-sulfenyl chloride is dependent upon the reaction temperature and increases at higher reaction temperatures. When the reaction is carried out at 70° C. with concurrent flow of the reactants (FIG. 2), the crude trichloromethane-sulfenyl chloride contains approximately 6.4 percent by weight of disulfur dichloride. If the reaction temperature is then reduced to 40° C., the disulfur dichloride content drops to approximately 2.5 percent. When using reaction temperatures in the range of about 0°–3° C., the crude trichloromethane-sulfenyl chloride contains only about 0.5 to 0.8 percent by weight of disulfur dichloride. By conducting the reaction with a countercurrent flow of the reactants (FIG. 1), the selectivity of the process according to the invention is even more favorable. In this case, the content of disulfur dichloride in the crude product is already as low as 0.6 percent by weight at a reaction temperature of 40° C.

It is apparent that at higher temperatures disulfur dichloride is formed from carbon disulfide and the intermediately formed sulfur dichloride. The correctness of this assumption can be proven by the fact that trichloromethane-sulfenyl chloride and disulfur dichloride are formed in the reaction of carbon disulfide and sulfur dichloride on active carbon at temperatures in the range of about 70° to 90° C. The reaction proceeds rapidly and with very high yields.

Thus, the chlorination of carbon disulfide can be controlled so that it proceeds almost exclusively according to Equation (2) above. In this case, the molar ratio of $CS_2:Cl_2$ is selected at approximately 2:5 and the reaction temperature is maintained in the higher range of about 40° to 100° C.

The active carbon used for purposes of the invention should be substantially free of iron to avoid the formation of carbon tetrachloride as a byproduct. Commercially available or so-called technical activated carbons often contain iron. However, for the process of the invention, the active carbon can be easily treated to remove the iron content as follows. First, the iron-containing active carbon is treated with a dilute aqueous hydrochloric acid until the iron is removed, then washed with water until free of acid and finally dried.

Active carbon is a well known substance prepared from a number of different carbonaceous materials in a conventional manner to provide carbon in an amorphous and highly porous state, i.e., having a large surface area per unit weight. The terms "active carbon" and "activated carbon" are used interchangeably herein to define these porous adsorbent carbons. Charcoal or other similar forms of active carbon may be used for purposes of the invention, preferably as crushed, ground or abraded solid particles with a particle size sufficient to establish a stable fixed bed for the reaction. An activated carbon with a particle size of approximately 2.5 to 4 mm. is especially preferred. Other than a preliminary removal of any iron content, no special precautions are essential for purposes of the invention.

It will be understood, of course, that the reaction tube itself should be substantially inert, i.e., so that it will not have an adverse effect upon the reaction. Glass tubes or similar inert liners may be used for the inner wall of the reaction tube, again avoiding the presence of iron.

The reaction proceeds in a fully satisfactory manner at normal pressures, i.e., under substantially atmospheric pressure, especially when working at lower temperatures of −5° to +40° C. Higher pressures are feasible but not essential in achieving the results.

The invention is further illustrated by but not restricted to the procedures set forth in the following examples. All percentages are by weight unless otherwise noted.

EXAMPLE 1

The process of the invention is carried out continuously in the apparatus set forth schematically in FIG. 1. This apparatus essentially includes a double jacketed cylindrical reaction tube 1 which is 100 cm. long and has an inner diameter of 25 mm. Within the reaction tube there is a cooling coil 5 adapted to permit a uniform cooling of the interior of the tube, e.g., by circulating any suitable heat exchange fluid through the coil. Feed means for the chlorine 2 and the carbon disulfide 3 are located as shown with the discharge line 4 being used to withdraw the chlorinated mixture from the bottom of the reaction tube.

The reaction tube is filled with 0.4 liters of a dry, iron-free, granulated active carbon which has a particle size of about 2.5 mm. and an inner or porous surface of 1,200 to 1,500 m²/g. Through the inlet 2 there are introduced 98 grams/hour of chlorine while 29 grams/hour of carbon disulfide are being introduced through the inlet 3. This feed of the two reactants corresponds to a molar ratio of $CS_2:Cl_2$ of 1:3.64. Water is employed as a cooling medium circulated through the cooling coil in an amount and at a temperature sufficient to maintain the interior of the reaction tube at a temperature of 40° C.

The reaction mixture is continuously drawn off through the outlet 4 and has the following composition:

| | |
|---|---|
| Trichloromethane-sulfenyl chloride ($CCl_3SCl$) | 54.0% |
| Sulfur dichloride ($SCl_2$) | 30.3% |
| Disulfur dichloride ($S_2Cl_2$) | 0.3% |
| Carbon tetrachloride ($CCl_4$) | 1.1% |
| Carbon disulfide ($CS_2$) | 0.18% |
| Chlorine (Cl) | 14.1% |

The carbon disulfide conversion is thus about 99.2 percent. The yields with reference to the reacted or converted carbon disulfide are as follows:

| | |
|---|---|
| $CCl_3SCl$ | 96.6% |
| $SCl_2$ | 97.8% |
| $S_2Cl_2$ | 1.4% |
| $CCl_4$ | 2.6% |

After a distillative separation of the more volatile components (chlorine, carbon disulfide, carbon tetrachloride and sulfur dichloride), there remains trichloromethane-sulfenyl chloride with a content of only 0.55 percent disulfur dichloride.

EXAMPLE 2

The same apparatus and procedure are followed as in Example 1 except that the feed of the reactants amounts to 64.2 grams per hour of carbon disulfide and 210.0 grams per hour of chlorine, corresponding to a molar ratio of $CS_2:Cl_2$ of 1:3.5. The resulting chlorinated reaction mixture has the following composition:

| | |
|---|---|
| $CCl_3SCl$ | 54.2% |
| $SCl_2$ | 31.6% |
| $S_2Cl_2$ | 0.45% |
| $CCl_4$ | 1.2% |
| $CS_2$ | 0.8% |
| $Cl$ | 11.8% |

The carbon disulfide conversion thus amounts to 96.6 percent. The yields with reference to the reacted carbon disulfide are as follows:

| | |
|---|---|
| $CCl_3SCl$ | 97.5% |
| $SCl_2$ | 98.6% |
| $S_2Cl_2$ | 1.4% |
| $CCl_4$ | 2.5% |

After separation of the more volatile components by distillation, the remaining trichloromethane-sulfenyl chloride has a disulfur dichloride content of only 0.8 percent.

EXAMPLE 3

The apparatus shown in FIG. 2 is employed while generally following the same procedure as in the preceding examples. In this case, the reactants are introduced at the upper end of the reaction tube at the rate of 29.8 grams/hour of carbon disulfide and 88.0 grams/hour of chlorine, corresponding to a molar ratio of $CS_2:Cl_2$ of 1:3.22. The reaction temperature is maintained by means of the circulated cooling water at 17° C. The reaction mixture withdrawn through outlet 4 has the following composition:

| | |
|---|---|
| $CCl_3SCl$ | 61.2% |
| $SCl_2$ | 34.1% |
| $S_2Cl_2$ | 0.8% |
| $CCl_4$ | 0.2% |
| $CS_2$ | 0.02% |
| $Cl$ | 3.6% |

The conversion rate of the carbon disulfide is thus 99.9 percent. The yields with reference to the reacted carbon disulfide are as follows:

| | |
|---|---|
| $CCl_3SCl$ | 99.6% |
| $SCl_2$ | 97.6% |
| $S_2Cl_2$ | 2.4% |
| $CCl_4$ | 0.4% |

After distillation to separate the more volatile components, the remaining trichloromethane-sulfenyl chloride product has a disulfur dichloride content of 1.35 percent.

EXAMPLE 4

The same apparatus and procedure are used as in Example 3, but in this instance the reaction temperature is maintained at 90° C. while introducing 29.0 grams/hour of carbon disulfide and 67.6 grams/hours of chlorine (corresponding to a molar ratio of $CS_2:Cl_2$ of 1:2.5). The resulting chlorinated reaction mixture has the following composition:

| | |
|---|---|
| $CCl_3SCl$ | 66.2% |
| $SCl_2$ | 2.8% |
| $S_2Cl_2$ | 27.3% |
| $CCl_4$ | 3.3% |
| $CS_2$ | 0.4% |

The conversion of carbon disulfide thus amounts to 98.7 percent. The yields of the various products with reference to the reacted carbon disulfide are as follows:

| | |
|---|---|
| $CCl_3SCl$ | 93.0% |
| $SCl_2$ | 3.4% |
| $S_2Cl_2$ | 95.2% |
| $CCl_4$ | 5.6% |

After distillation to separate the more volatile components, there remains a crude and relatively impure trichloromethane-sulfenyl chloride with a disulfur dichloride content of 29.3 percent. This crude mixture can be further purified, e.g., by steam distillation, without any substantial loss of the desired product.

Compared to the known chlorination processes which depend upon the Rathke method, the process according to the present invention under the preferred conditions of the molar ratio of $CS_2$ to $Cl_2$ selectively produces as byproducts practically only the more volatile components, i.e., sulfur dichloride and only slight amounts of carbon tetrachloride. Thus, almost no higher boiling byproducts are formed so that complicated separating steps are not required for the isolation of the trichloromethane-sulfenyl chloride in a relatively pure form. Moreover, the use of iodine, its separation and recovery are no longer necessary under any of the conditions of the present invention. The chlorination in the presence of active carbon proceeds exceptionally rapidly and is capable of selective control as well as providing nearly quantitative yields while permitting high throughputs. Also, the active carbon retains its complete effectiveness in the process of the invention over long periods of operation. Although some prior art processes were capable of being carried out continuously, e.g., as set forth in the above-noted East German Pat. No. 36,260, the apparatus and procedures required in this prior art is essentially more complicated than that recommended for conducting the process of the present invention. Furthermore, the yields achieved in the prior art are not nearly as good as those which can be obtained by the process of the invention.

A particular advantage of the process of this invention over that disclosed in German Pat. No. 1,229,518 resides in the fact that the chlorine requirements are substantially less. In addition, sulfur dichloride as a valuable byproduct is obtained rather than the much less desirable hydrochloric and sulfuric acid byproducts of the known process.

From the above working examples, it will be apparent that a particularly advantageous production of trichloromethane-sulfenyl chloride is achieved when the process of the invention is selectively controlled to avoid or at least substantially reduce the amount of disulfur dichloride being formed. On the other hand, relatively wide variations can be made in the operating conditions without losing high yields of the desired product so that the process of the invention represents a significant improvement even when the preferred conditions are ignored. Also, even though a countercurrent flow of the reaction components offers some advantage, especially on a commercial scale, it will be recognized that the invention is not dependent on the use of special apparatus or its arrangement in terms of feed positions or direction of flow through the bed of active carbon.

Trichloromethane-sulfenyl chloride is a valuable intermediate for the production of thiophosgene and for the preparation of herbicides.

The invention is hereby claimed as follows:

1. A process of the production of trichloromethane-sulfenyl chloride which comprises reacting carbon disulfide with chlorine in intimate contact with activated carbon at a temperature of about −5° to +100° C.

2. A process as claimed in claim 1 wherein the reaction is carried out at a temperature of about −5° to +40° C.

3. A process as claimed in claim 1 wherein the reaction is carried out by conducting the carbon disulfide and chlorine through a bed of activated carbon particles.

4. A process as claimed in claim 3 wherein said reaction is carried out at a temperature of about −5° to +40° C.

5. A process as claimed in claim 4 wherein said activated carbon has a particle size of about 2.5 to 4 mm.

6. A process as claimed in claim 1 wherein the carbon disulfide and chlorine are reacted in a molar ratio of about 1:2 to 1:4.

7. A process as claimed in claim 1 wherein said reaction is carried out in a reaction zone containing a fixed bed of activated carbon particles, the carbon disulfide and chlorine in a molar ratio of about 1:2 to 1:4 being conducted into the upper portion of said reaction zone and a liquid reaction product containing trichloromethane-sulfenyl chloride and chlorides of sulfur being withdrawn from the bottom of said reaction zone.

8. A process as claimed in claim 1 wherein said reaction is carried out in a reaction zone containing a fixed bed of activated carbon particles, the carbon disulfide is conducted into the upper portion of said reaction zone, said chlorine is conducted into the lower portion of said reaction zone, the molar ratio of said carbon disulfide to said chlorine amounting to about 1:2 to 1:4, and a liquid reaction product containing trichloromethane-sulfenyl chloride and chlorides of sulfur is withdrawn from the bottom end of said reaction zone.

9. A process as claimed in claim 8 wherein the molar ratio of carbon disulfide to chlorine amounts to about 1:3 to 1:4.

10. A process as claimed in claim 1 wherein said activated carbon is substantially free of iron.

* * * * *

PO-1050
(5/69)

UNITED STATES PATENT OFFICE
CERTIFICATE OF CORRECTION

Patent No. 3,673,246     Dated June 27, 1972

Inventor(s) Gerhard Meyer et al

It is certified that error appears in the above-identified patent and that said Letters Patent are hereby corrected as shown below:

Column 1, line 11, "1.1" should read -- 1.0 --.

Column 3, line 27, "temperature is selected between about 5° C." should read -- reaction temperature is selected between about -5° C. --.

Signed and sealed this 24th day of October 1972.

(SEAL)
Attest:

EDWARD M. FLETCHER, JR.
Attesting Officer

ROBERT GOTTSCHALK
Commissioner of Patents